United States Patent
Hsieh

(10) Patent No.: US 7,696,981 B2
(45) Date of Patent: Apr. 13, 2010

(54) WIRELESS HUMAN INPUT DEVICE

(75) Inventor: Kao-Cheng Hsieh, Sijhih (TW)

(73) Assignee: Behavior Tech Computer Corp., Sijhih (TW)

( * ) Notice: Subject to any disclaimer, the term of this patent is extended or adjusted under 35 U.S.C. 154(b) by 518 days.

(21) Appl. No.: 10/797,192

(22) Filed: Mar. 11, 2004

(65) Prior Publication Data

US 2005/0200594 A1 Sep. 15, 2005

(30) Foreign Application Priority Data

Aug. 26, 2003 (TW) ................ 92215410 U

(51) Int. Cl.
G09G 5/00 (2006.01)
G09G 5/08 (2006.01)

(52) U.S. Cl. .............. 345/158; 345/169; 348/734; 341/173

(58) Field of Classification Search ......... 345/156, 345/158, 168, 169; 348/734; 398/106; 340/825.72, 340/825.64, 825.44, 825.52; 341/173, 174; 370/328, 338

See application file for complete search history.

(56) References Cited

U.S. PATENT DOCUMENTS

| 4,807,031 | A |  | 2/1989 | Broughton et al. |
| 5,199,031 | A |  | 3/1993 | Dahlin |
| 5,475,863 | A |  | 12/1995 | Simpson et al. |
| 5,515,051 | A | * | 5/1996 | Tanaka et al. ............... 341/174 |
| 5,583,819 | A |  | 12/1996 | Roesner et al. |
| 5,737,107 | A | * | 4/1998 | Umeda ....................... 398/106 |
| 6,085,081 | A |  | 7/2000 | Leskinen |
| 6,094,238 | A | * | 7/2000 | Shafer ......................... 348/734 |
| 6,147,719 | A | * | 11/2000 | Shafer ......................... 348/734 |
| 6,275,478 | B1 |  | 8/2001 | Tiedemann, Jr. |
| 6,526,091 | B1 |  | 2/2003 | Nystrom |
| 2002/0152044 | A1 |  | 10/2002 | Shanks et al. |
| 2003/0210662 | A1 | * | 11/2003 | Rensberger et al. ......... 370/328 |

FOREIGN PATENT DOCUMENTS

| JP | 01-141423 | 2/1989 |
| JP | 2000258486 | 9/2000 |
| JP | 2000258487 | 9/2000 |
| JP | 2000350249 | 12/2000 |
| TW | 475991 | 2/2002 |

OTHER PUBLICATIONS

U.S. Appl. No. 60/094,106, filed Jul. 24, 1998, Kay, Stan.
U.S. Appl. No. 60/136,664, filed May 28, 1999, Sezgin, Nadir.

* cited by examiner

Primary Examiner—Kevin M Nguyen
(74) Attorney, Agent, or Firm—Heather M. Colburn; Michael J. Donohue; Davis Wright Tremaine LLP

(57) ABSTRACT

The wireless human input device comprises at least one wireless human transmitting unit and a wireless human receiving unit. The wireless human transmitting unit generates leading signals and data signals and transmits the signals to the wireless human receiving unit. The wireless human receiving unit receives all of the leading signals and identifies the data signals based on the leading signals so as to distinguish the data signals being transmitted by which wireless human transmitting unit.

15 Claims, 5 Drawing Sheets

WIRELESS HUMAN INPUT DEVICE

FIELD OF THE INVENTION

The present invention is related to wireless human input device, and especially to a wireless human input device using different leading signals to prevent data interference.

BACKGROUND OF THE INVENTION

U.S. Pat. No. 5,854,621 titled "WIRELESS MOUSE" discloses a communication system used to receive signals representing displacement action of a peripheral device, the communication system includes a first peripheral device and a receiving unit; wherein the first peripheral device must have a first nonvolatile memory device to store a first identifier, and the receiving unit has a second nonvolatile memory device to store the first identifier and authorized identifiers of other peripheral devices. The U.S. Pat. No. 5,854,621 can solve the problems of data interference in data transmission and receiving between the peripheral devices and receiving units, however, the peripheral devices for transmitting data must use nonvolatile memory devices to permanently store the identifiers. Due to U.S. Pat. No. 5,854,621 using the components of the nonvolatile memory devices, it causes increase of production cost and this is deficiency thereof.

In view of above defect and deficiency involved in the prior art, the inventor of the present invention develops a wireless human input device that can overcome the problems of data interference even without the memory device.

SUMMARY OF THE INVENTION

The present invention provides a wireless human input device, which allows a plurality of wireless human transmitting units to commonly share a wireless human receiving unit under a working frequency, can overcome data interference as well so that the wireless human receiving unit can smoothly receive and identify data transmitted from the wireless human transmitting unit.

Therefore, in order to get the abovementioned object, the wireless human input device of the present invention comprise: a plurality of wireless human transmitting units and a wireless human receiving unit. The wireless human transmitting units are used for generating different leading signals and data signals sand transmitting the leading signals and the data signals to the wireless human receiving unit. The wireless human receiving unit is used for identifying each of the data signals being corresponding to which leading signal.

These objects and other objects and advantages of the present invention will become more apparent upon reading of the following detailed description and the accompanying drawings in which:

DETAILED DESCRIPTION OF THE INVENTION

Figure 1:
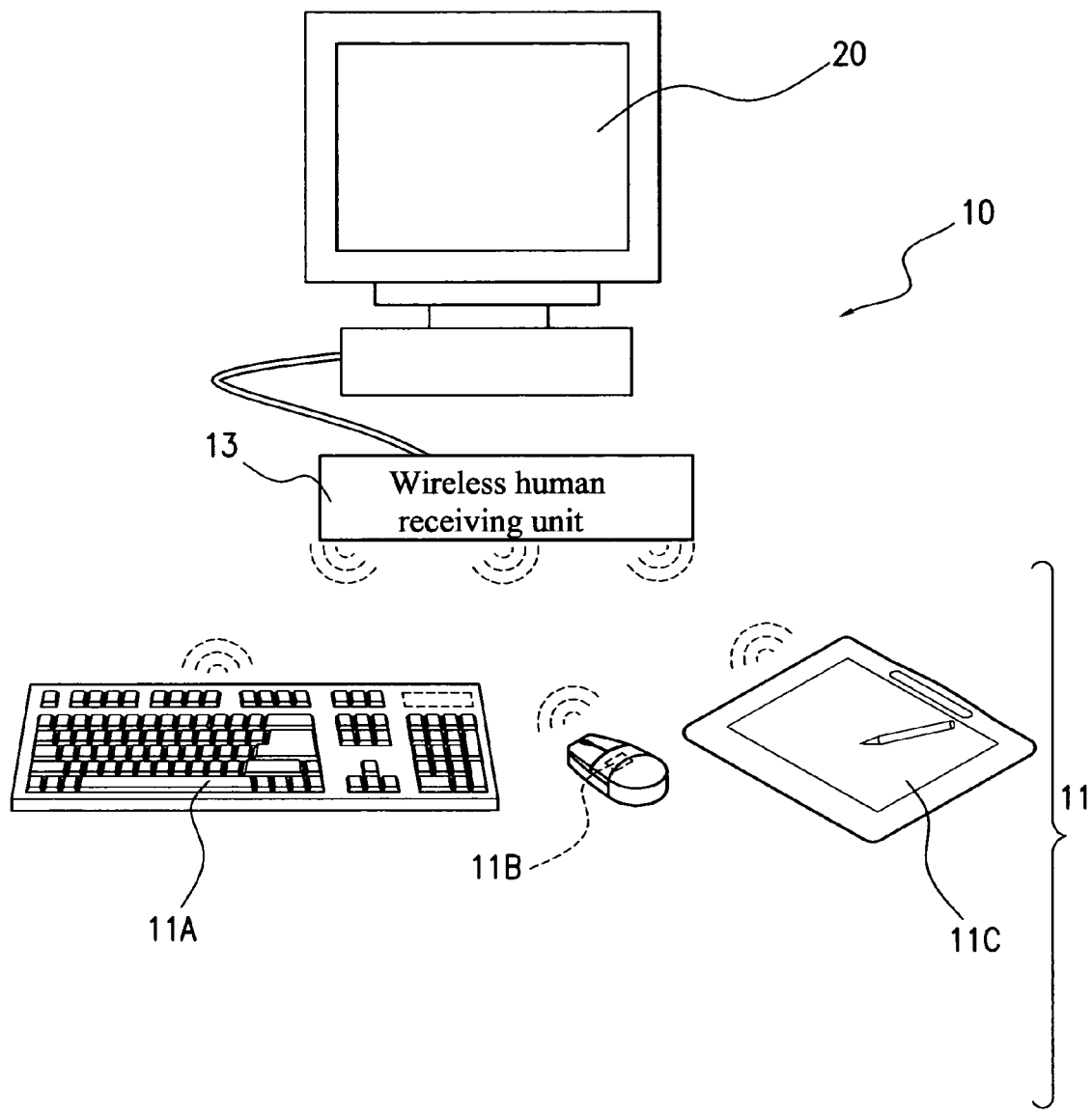
FIG. 1 is a diagram showing application of the present invention.

FIG. 1 is a diagram showing application of the present invention; wherein a wireless human input device 10 of the present invention mainly is composed of a plurality of wireless human transmitting units 11 and a wireless human receiving unit 13. The wireless human receiving units 11 include a wireless keyboard transmitting unit 11A, a wireless mouse transmitting unit 11B, a wireless touch pad transmitting unit 11C and etc. These wireless human transmitting units 11 use the same frequency to transmit data to the wireless human receiving unit 13 commonly. The common wireless human receiving unit 13 receives data emitted from the wireless human transmitting units 11 and the data can be identified respectively. Further, the wireless human receiving unit 13 clearly knows the data from which of these wireless human transmitting units 11. Then, the data is sent to a corresponding driver in a computer 20 for further accessing.

Figure 2:
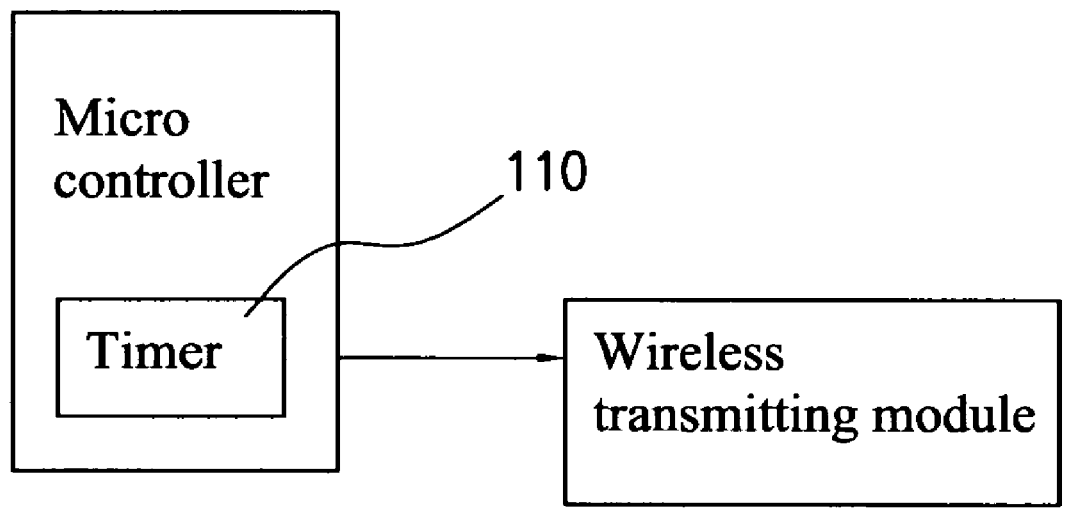
FIG. 2 is a schematic view showing the hardware structure of a wireless human transmitting unit of the present invention.
Figure 3:
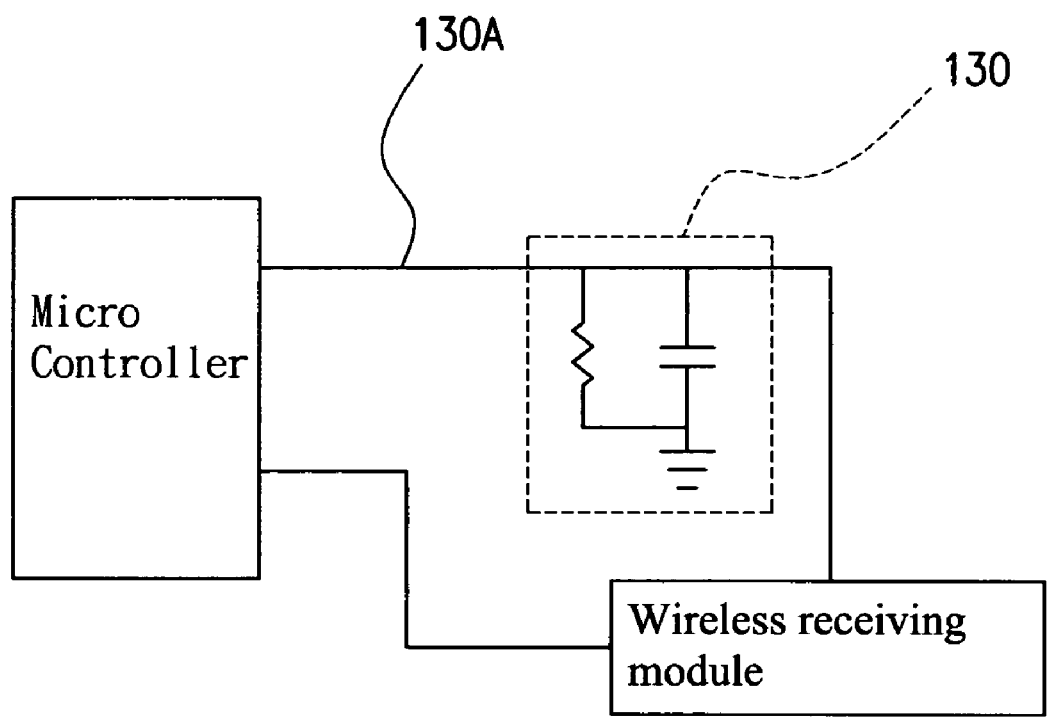
FIG. 3 is a schematic view showing the hardware structure of a wireless human receiving unit of the present invention.
Figure 4:
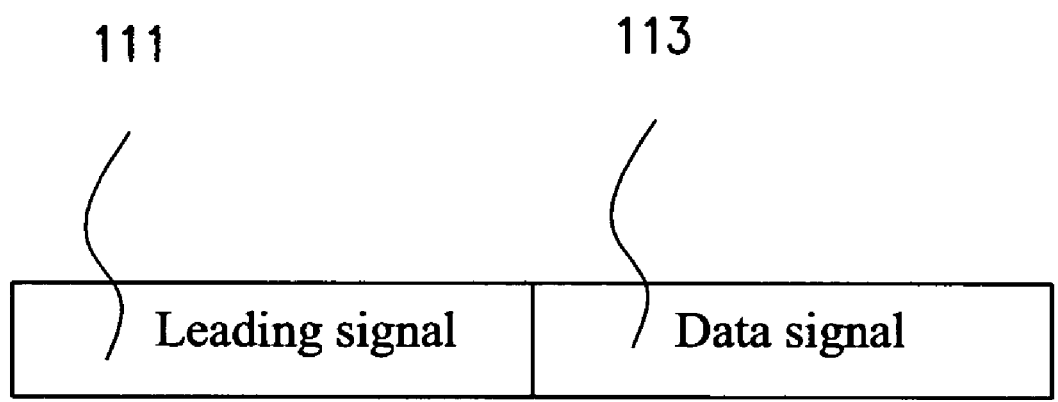
FIG. 4 is a schematic view showing the signals transmitted from a wireless human transmitting unit of the present invention.
Figure 5:
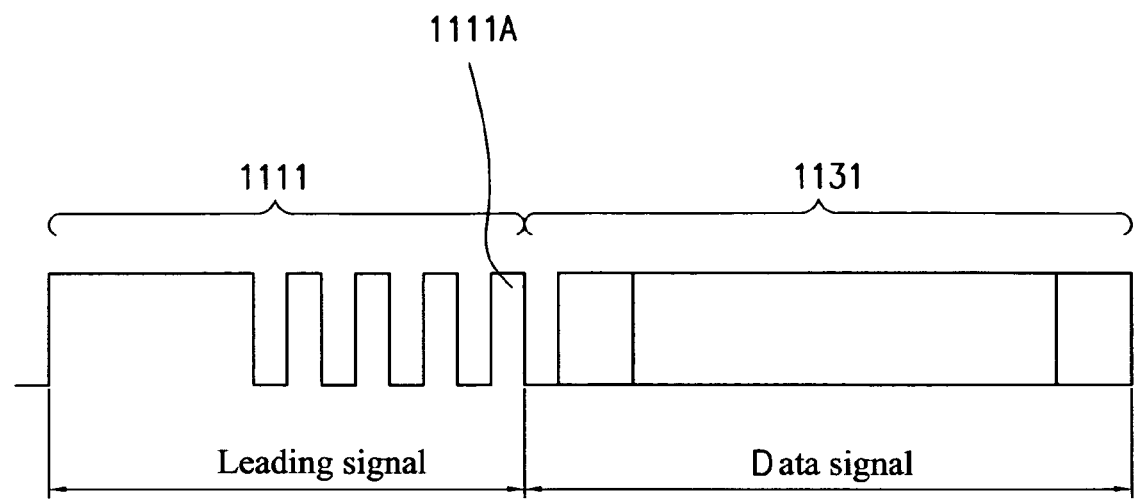
FIG. 5 is a waveform diagram of a leading signal used for a wireless mouse transmitting unit of the present invention.
Figure 6:
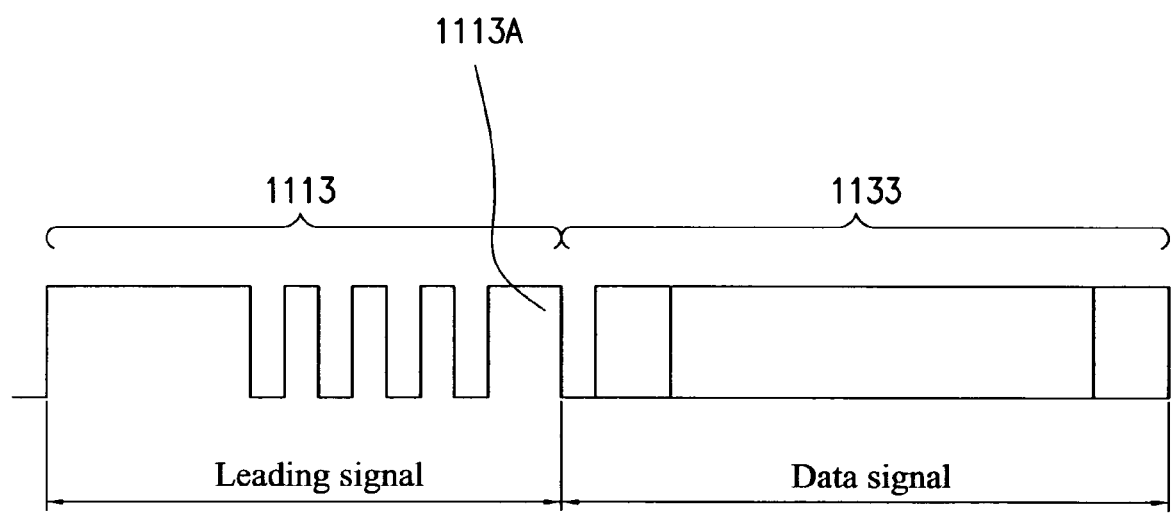
FIG. 6 is a waveform diagram of a used for a wireless keyboard transmitting unit of the present invention.

FIG. 2 is a schematic view showing the hardware structure of a wireless human transmitting unit of the present invention; FIG. 3 is a schematic view showing the hardware structure of a wireless human receiving unit of the present invention and FIG. 4 is a schematic view showing the signals transmitted from a wireless human transmitting unit of the present invention. The wireless human transmitting units 11 are mainly used to generate leading signals 111 and data signals 113, and the signals 111, 113 are sent to the wireless human receiving unit 13. The most important feature of the present invention is that the wireless human receiving units 13 can identify different corresponding wireless human transmitting units 11 by way of different leading signals 111. The waveform diagram shown in FIG. 5 is leading signal 111 generated by the wireless mouse transmitting unit and the waveform diagram shown in FIG. 6 is leading signal 1113 generated by the wireless keyboard transmitting unit. The leading signal 1111 includes a waveform signal 1111A with a wavelength of 300 µS, while the leading signal 1113 includes a waveform signal 1113A with a wave length of 700 µS. Hence, in an aspect to the whole, the leading signal 1111 used on the wireless mouse transmitting unit 11B and the leading signal 1113 used on the wireless keyboard transmitting unit 11A are totally different. Once the common wireless human receiving unit 13 receives a data packet containing the leading signal 1111 and another data packet containing the leading signal 1113, the wireless human receiving unit 13 can distinguish the two data packets according to the difference between the waveform signal 1111A and the waveform signal 1113A, namely, the wireless human receiving unit 13 can recognize data signal 1131 transmitted by the wireless mouse transmitting unit 11B and data signal 1133 transmitted by the wireless keyboard transmitting unit 11A.

The leading signals 111 used in the wireless human transmitting units 11 of the present invention are generated from a first electronic circuit device 110 and the first electronic circuit device 110 can be a timer 110 of a micro controller in practice. The timer in the micro controller is set with different time parameters to generate the preceding waveform signal 1111A with a waveform length of 300 µS and the waveform signal 1113A with a waveform length of 700 µS.

A second electronic circuit device 130 of the wireless human receiving unit 13 of the present invention can identify different leading signals 1111 and 1113 and the second electronic circuit device 130 can be a charging and discharging circuit, which contains capacitors and electronic components, for being able to have time parameters in practice. The second electronic circuit device 130 outputs low or high level signals 130A according to the waveform signal 1111A and the waveform signal 1113A. For instance, a low level signal 130A can be output based on the waveform signal 1111A of 300 µS, and a high level signal 130A can be output based on the waveform signal 1113A of 700 µS.

The preceding data signals 113 are mainly used to carry the data transmitted from the wireless human transmitting units 11 to the wireless human receiving unit 13. Taking the wireless mouse as an example, the data signal 1131 of the wireless mouse transmitting unit 11B contains coordinate displacement data of a cursor, the data of clicking or releasing the left key, the right key or the middle key, the data of rolling the roller and etc. Taking a wireless keyboard as an example, the data signal 1133 of the wireless keyboard transmitting unit 11A contains the data of scan codes for one of the keys on the keyboard.

FIG. 1 is a diagram showing application of the present invention; wherein a wireless human input device 10 of the present invention mainly is composed of a plurality of wireless human transmitting units 11 and a wireless human receiving unit 13. The wireless human transmitting units 11 include a wireless keyboard transmitting unit 11A, a wireless mouse transmitting unit 11B, a wireless touch pad transmitting unit 11C and etc. These wireless human transmitting units 11 use the same frequency to transmit data to the wireless human receiving unit 13 commonly. The common wireless human receiving unit 13 receives data emitted from the wireless human transmitting units 11 and the data can be identified respectively. Further, the wireless human receiving unit 13 clearly knows the data from which of these wireless human transmitting units 11. Then, the data is sent to a corresponding driver in a computer 20 for further accessing.

FIG. 2 is a schematic view showing the hardware structure of a wireless human transmitting unit of the present invention; FIG. 3 is a schematic view showing the hardware structure of a wireless human receiving unit of the present invention and FIG. 4 is a schematic view showing the signals transmitted from a wireless human transmitting unit of the present invention. The wireless human transmitting units 11 are mainly used to generate leading signals 111 and data signals 113, and the signals 111, 113 are sent to the wireless human receiving unit 13. The most important feature of the present invention is that the wireless human receiving units 13 can identify different corresponding wireless human transmitting units 11 by way of different leading signals 111. The waveform diagram shown in FIG. 5 is leading signal 1111 generated by the wireless mouse transmitting unit and the waveform diagram shown in FIG. 6 is leading signal 1113 generated by the wireless keyboard transmitting unit. The leading signal 1111 includes a waveform signal 1111A with a wavelength of 300 µS, while the leading signal 1113 includes a waveform signal 1113A with a wavelength of 700 µS. Hence, in an aspect to the whole, the leading signal 1111 used on the wireless mouse transmitting unit 11B and the leading signal 1113 used on the wireless keyboard transmitting unit 11A are totally different. Once the common wireless human receiving unit 13 receives a data packet containing the leading signal 1111 and another data packet containing the leading signal 1113, the wireless human receiving unit 13 can distinguish the two data packets according to the difference between the waveform signal 1111A and the waveform signal 1113A, namely, the wireless human receiving unit 13 can recognize data signal 1131 transmitted by the wireless mouse transmitting unit 11B and data signal 1133 transmitted by the wireless keyboard transmitting unit 11A.

What is claimed is:

1. A system comprising:
    a first wireless transmitting unit configured to transmit a first signal comprising a leading portion and a data portion different from the leading portion, the leading portion comprising a first waveform signal having a first wavelength;
    a second wireless transmitting unit configured to transmit a second signal comprising a leading portion and a data portion different from the leading portion, the leading portion comprising a second waveform signal having a second wavelength different from the first wavelength; and
    a wireless receiving unit configured to receive the first signal and the second signal and determine the first signal was transmitted by the first wireless transmitting unit based on the first wavelength and the second signal was transmitted by the second wireless transmitting unit based on the second wavelength.

2. The system of claim 1, wherein the first wireless transmitting unit is a wireless mouse, a wireless keyboard, or a wireless touch pad.

3. The system of claim 2, wherein the second wireless transmitting unit is a wireless mouse, a wireless keyboard, or a wireless touch pad.

4. The system of claim 1, wherein the wireless receiving unit comprises an electronic circuit configured to determine the first signal was transmitted by the first wireless transmitting unit based on the first wavelength and the second signal was transmitted by the second wireless transmitting unit based on the second wavelength.

5. The system of claim 4, wherein the electronic circuit is configured to output a low level signal when the wireless receiving unit receives the first signal and a high level signal when the wireless receiving unit receives the second signal.

6. The system of claim 1, wherein the first wireless transmitting unit comprises a timer configured to determine the first wavelength of the first waveform signal of the leading portion of the first signal and the second wireless transmitting unit comprises a timer configured to determine the second wavelength of the second waveform signal of the leading portion of the second signal.

7. The system of claim 6, wherein the timer of the first wireless transmitting unit is set with a first time parameter configured to generate the first waveform signal having the first wavelength and the timer of the second wireless transmitting unit is set with a second time parameter different from the first time parameter configured to generate the second waveform signal having the second wavelength.

8. The system of claim 1, wherein the first wireless transmitting unit and the second wireless transmitting unit transmit the first and second signals, respectively, using the same transmit frequency.

9. A system comprising:
    a first wireless transmitting unit comprising means for generating a first signal comprising a leading portion and a data portion different from the leading portion, the leading portion comprising a first waveform signal having a first wavelength and means for transmitting the first signal to a wireless receiving unit;
    a second wireless transmitting unit means for generating a second signal comprising a leading portion and a data portion different from the leading portion, the leading portion comprising a second waveform signal having a second wavelength different from the first wavelength and means for transmitting the second signal to the wireless receiving unit; and a wireless receiving unit comprising means for receiving the first signal and the second signal and means for determining the first signal was transmitted by the first wireless transmitting unit and the second signal was transmitted by the second wireless transmitting unit based on the first and second wavelengths.

10. A wireless receiving unit for use with a plurality of wireless transmitting units, each wireless transmitting unit transmitting a signal having a leading portion and a data portion different from the leading portion, the leading portion comprising a waveform signal, each of the waveform signals transmitted by the plurality of wireless transmitting units having a different wavelength, the wireless receiving unit comprising:

a wireless receiving module configured to receive the signals transmitted by the plurality of wireless transmitting units; and an electronic circuit configured to distinguish the signals received from one another based on differences in the wavelengths of the waveform signals of the leading portions of the received signals.

11. The wireless receiving unit of claim 10, wherein the electronic circuit is configured to output a signal having a different signal level for each different wavelength of the waveform signals of the leading portions of the received signals.

12. The wireless receiving unit of claim 10, wherein the electronic circuit is a charging and discharging circuit.

13. A method comprising:

receiving a first signal lacking a device identifier from a first wireless transmitting unit, the first signal having a leading portion preceding a data portion, the leading portion having a waveform signal with a first wavelength;

receiving a second signal lacking a device identifier from a second wireless transmitting unit, the second signal having a leading portion preceding a data portion, the leading portion having a waveform signal with a second wavelength; and determining the first signal was transmitted by the first wireless transmitting unit and the second signal was transmitted by the second wireless transmitting unit based on the first and second wavelengths.

14. The method of claim 13, further comprising:

at the first wireless transmitting unit, transmitting the first signal; and at the second wireless transmitting unit, transmitting the second signal.

15. The method of claim 13, further comprising:

identifying first data in the first signal;

sending the first data to a first driver in a computer for processing thereby;

identifying second data in the second signal; and sending the second data to a second driver in a computer for processing thereby.

* * * * *